Feb. 4, 1936.   C. H. KAIN   2,030,022
HYDRAULICALLY CONTROLLED DUPLICATING MACHINE
Filed April 13, 1934   7 Sheets-Sheet 1
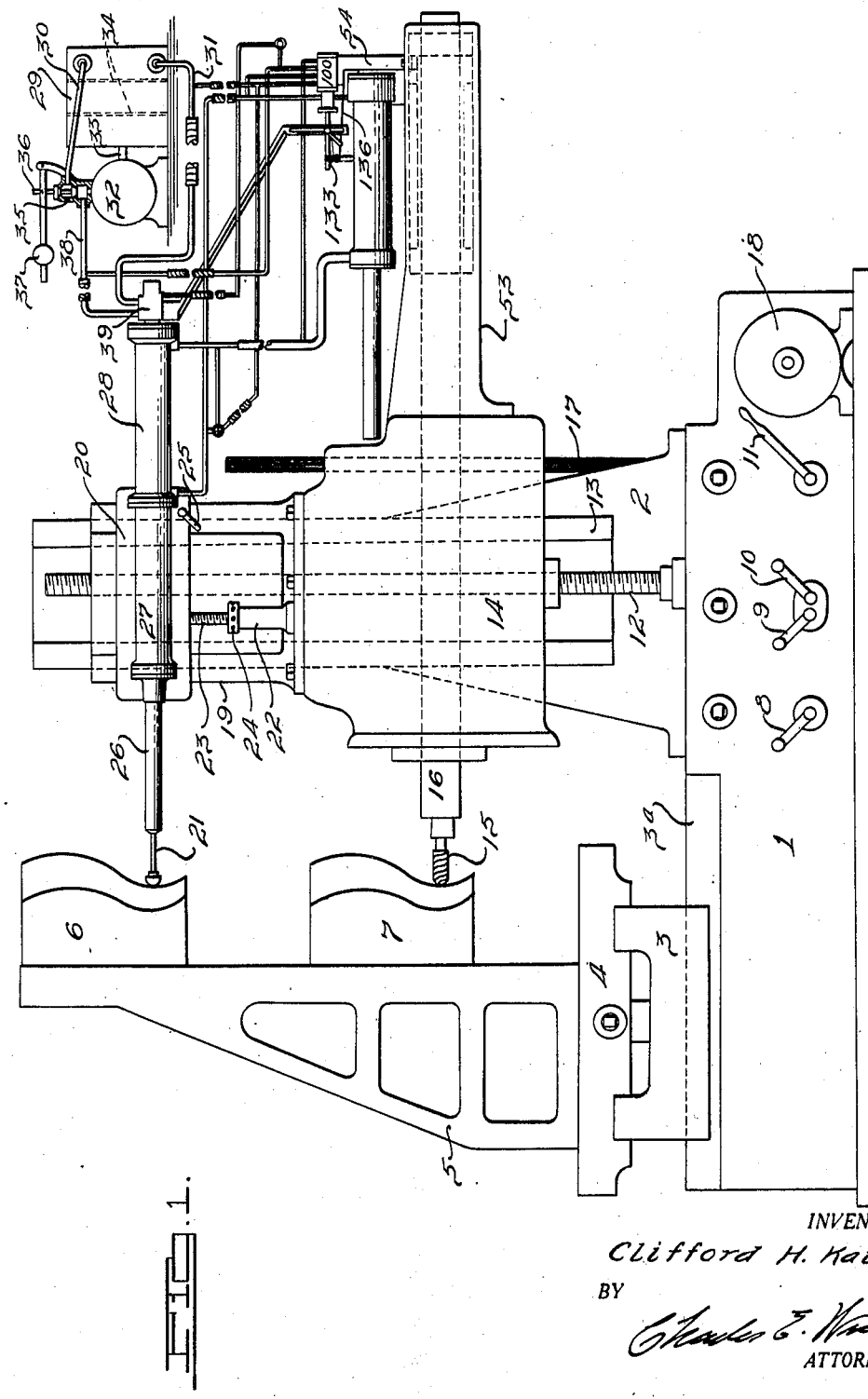
INVENTOR.
Clifford H. Kain.
BY
ATTORNEY.

Feb. 4, 1936.  C. H. KAIN  2,030,022
HYDRAULICALLY CONTROLLED DUPLICATING MACHINE
Filed April 13, 1934  7 Sheets-Sheet 2
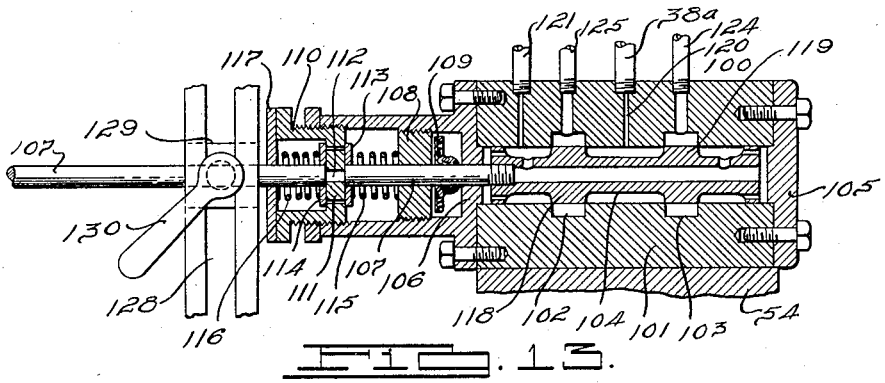
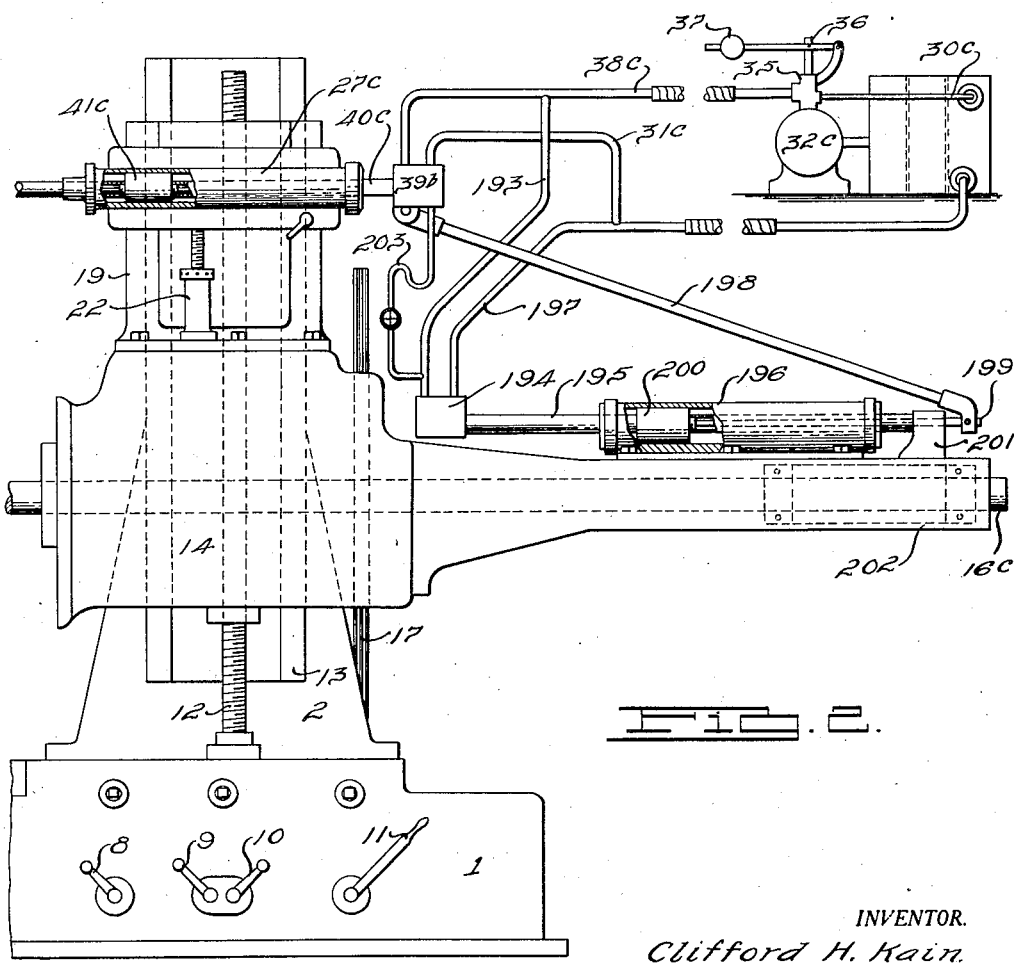
INVENTOR.
Clifford H. Kain.
BY
ATTORNEY.

Feb. 4, 1936.                    C. H. KAIN                    2,030,022
               HYDRAULICALLY CONTROLLED DUPLICATING MACHINE
                     Filed April 13, 1934           7 Sheets-Sheet 3
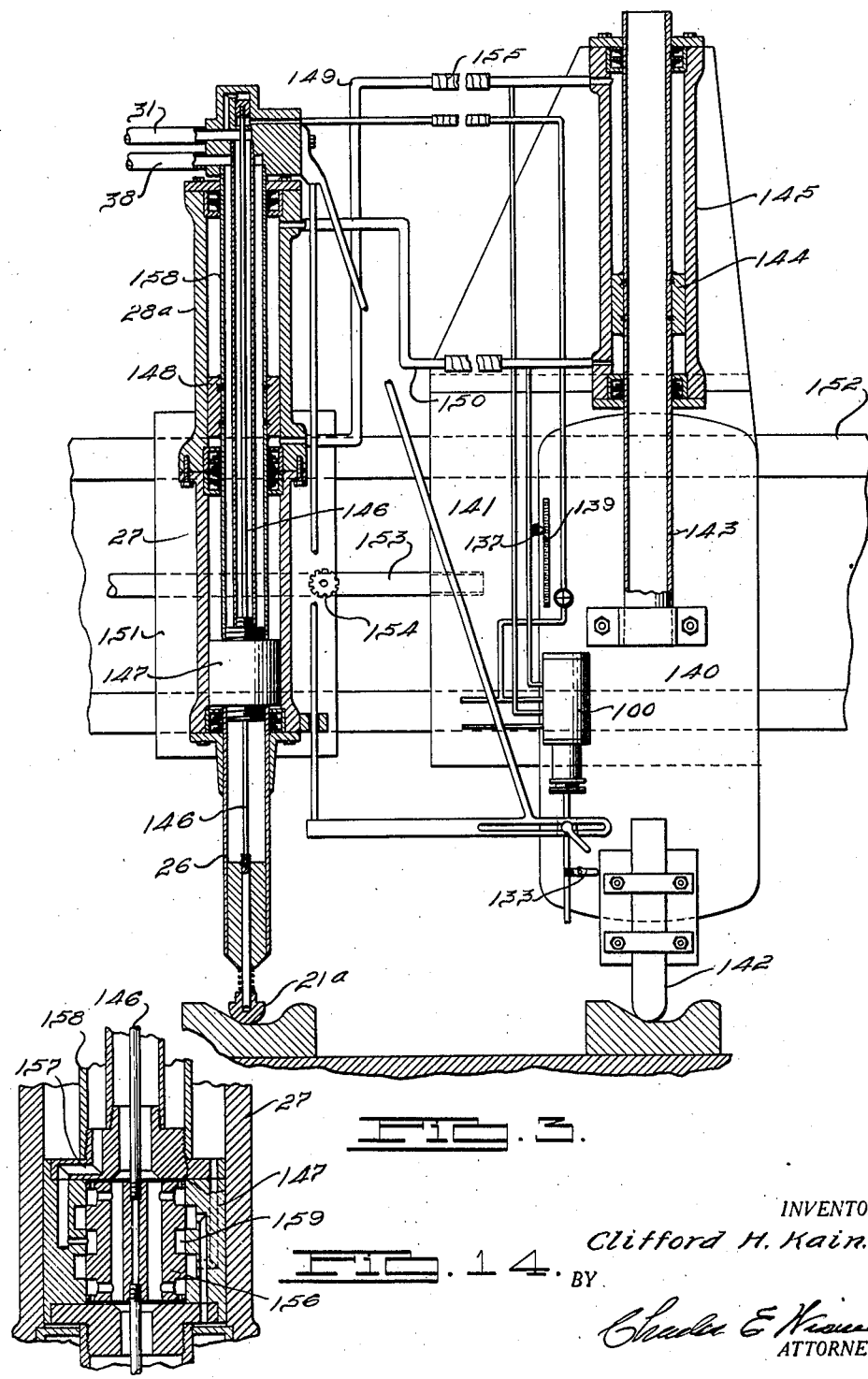
INVENTOR.
Clifford H. Kain.
BY
ATTORNEY.

Feb. 4, 1936.                C. H. KAIN                2,030,022
            HYDRAULICALLY CONTROLLED DUPLICATING MACHINE
                    Filed April 13, 1934        7 Sheets-Sheet 4

INVENTOR.
Clifford H. Kain.
BY
ATTORNEY.

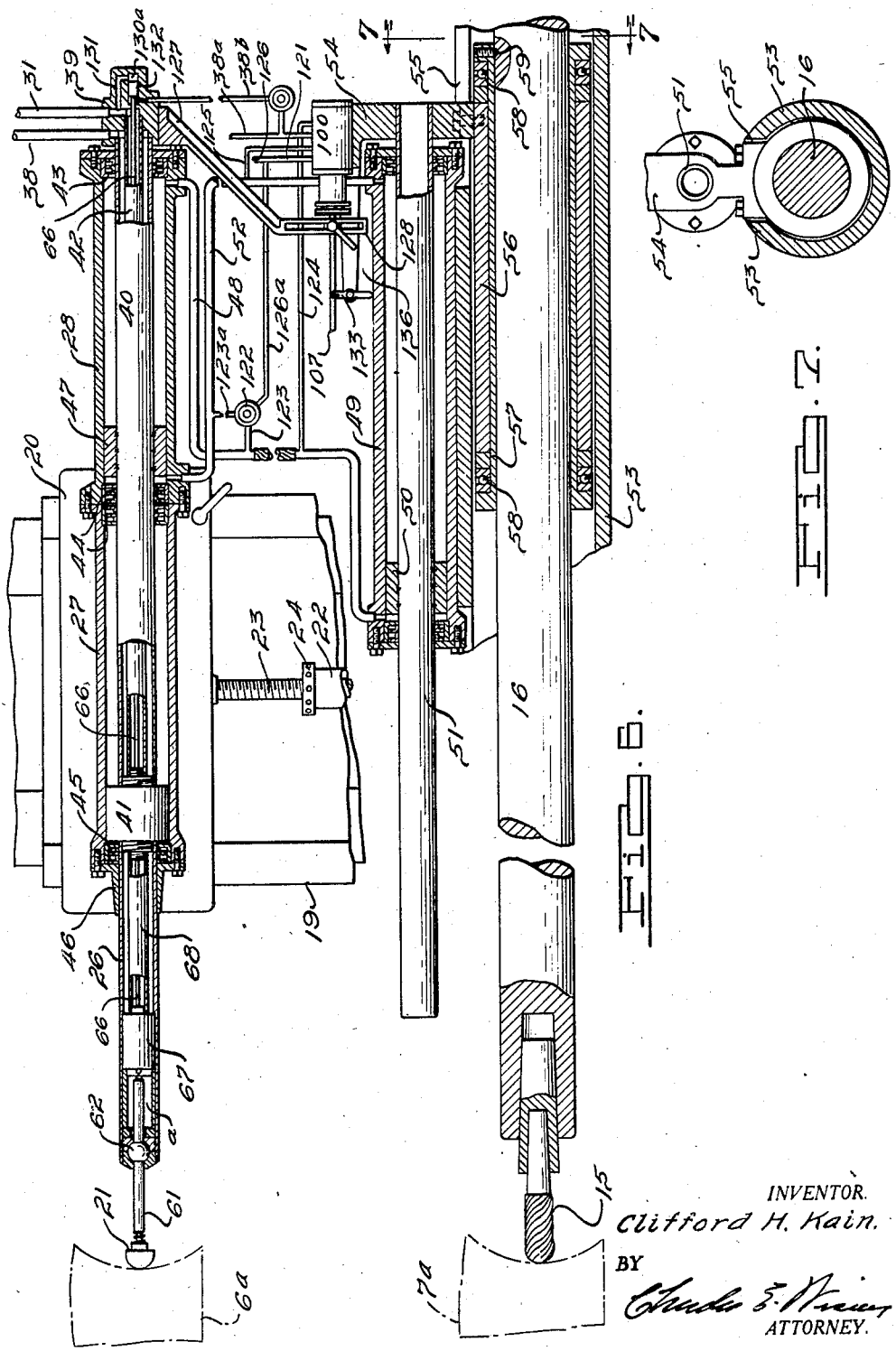

Feb. 4, 1936.  C. H. KAIN  2,030,022
HYDRAULICALLY CONTROLLED DUPLICATING MACHINE
Filed April 13, 1934  7 Sheets-Sheet 6
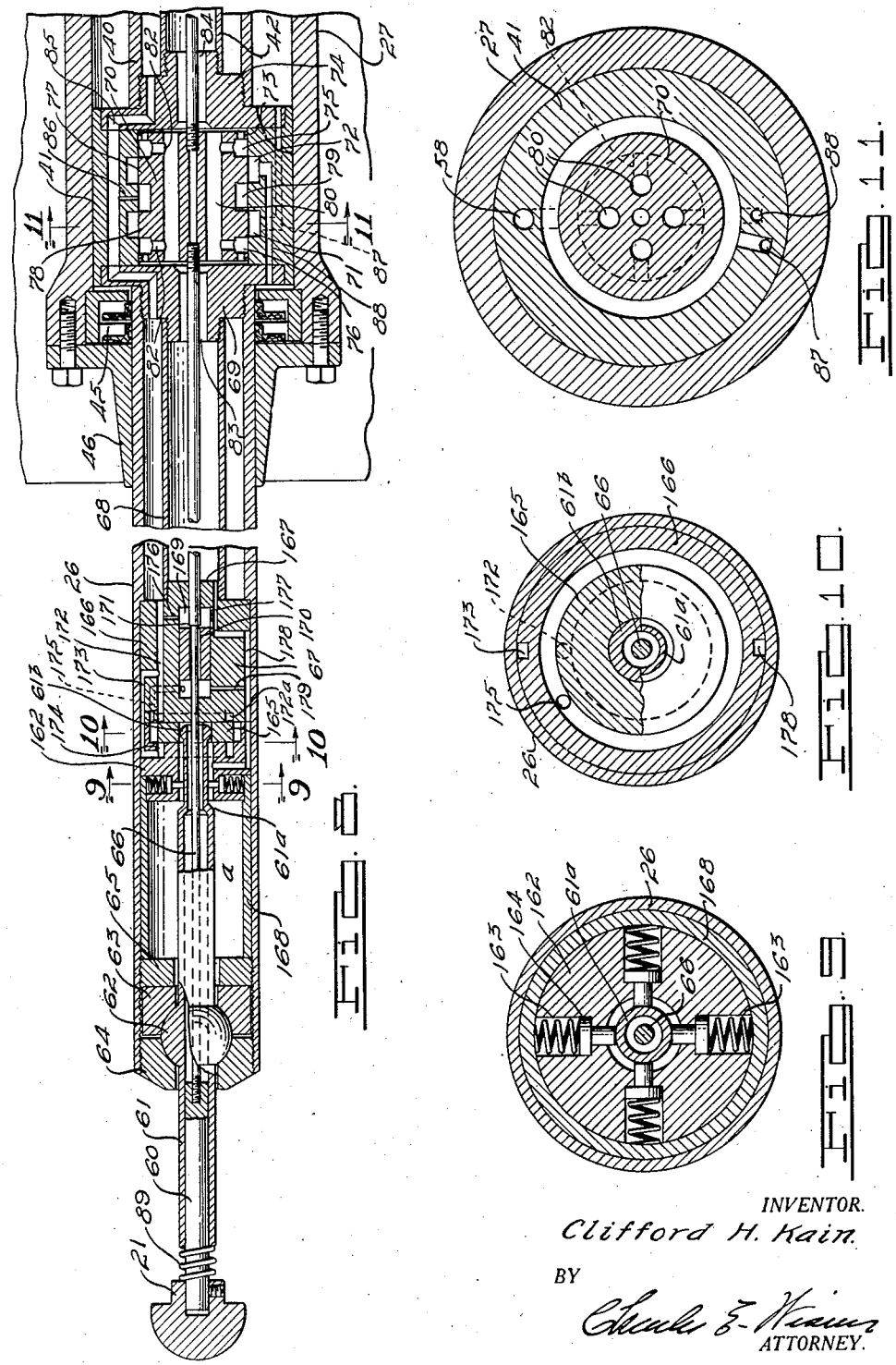
INVENTOR.
Clifford H. Kain.
BY
ATTORNEY.

Feb. 4, 1936.                C. H. KAIN                2,030,022
              HYDRAULICALLY CONTROLLED DUPLICATING MACHINE
                  Filed April 13, 1934        7 Sheets-Sheet 7
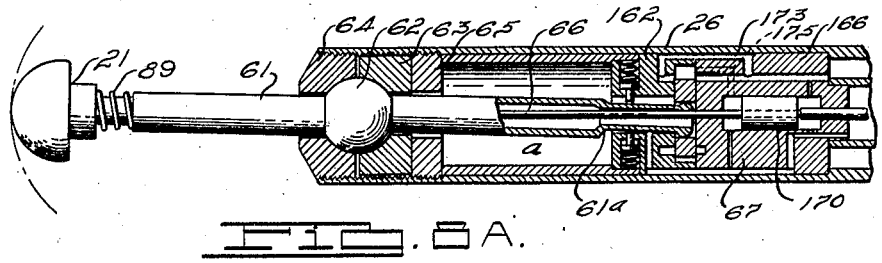
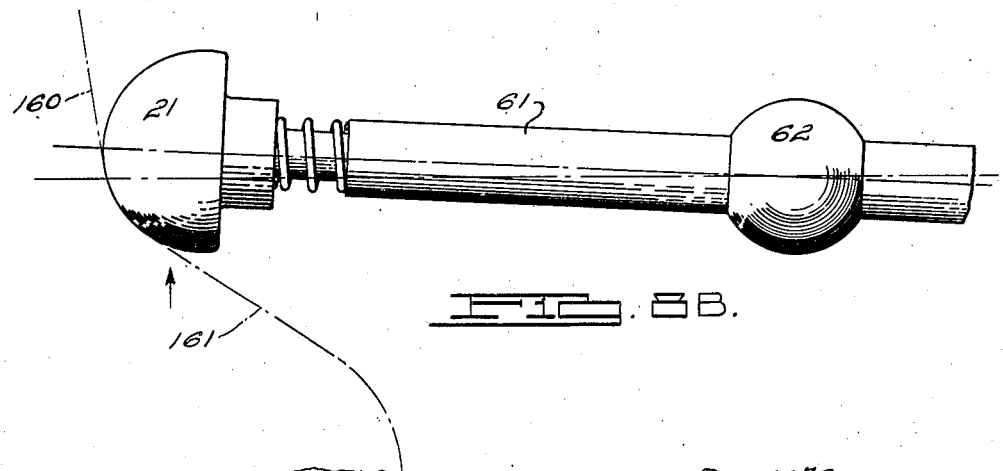
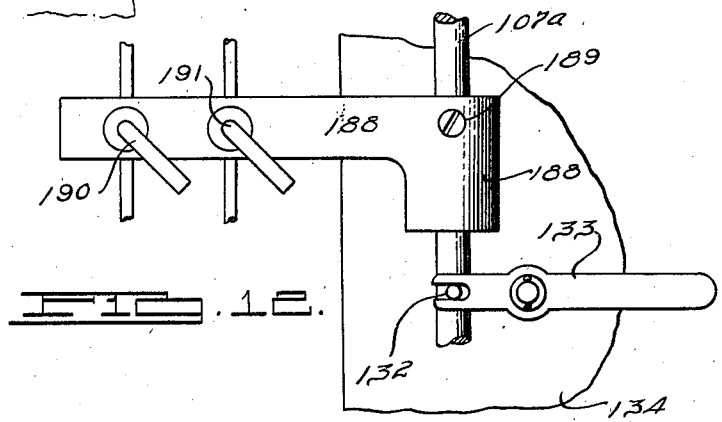
INVENTOR.
Clifford H. Kain.
BY
ATTORNEY.

Patented Feb. 4, 1936

2,030,022

UNITED STATES PATENT OFFICE 2,030,022

HYDRAULICALLY CONTROLLED DUPLICATING MACHINE

Clifford H. Kain, San Carlos, Calif., assignor of one-third to Clement C. Richard, Bloomfield Hills, Mich., and one-third to Detroit Trust Company, Detroit, Mich., executor of the estate of Otis K. Richard, deceased Application April 13, 1934, Serial No. 720,375

25 Claims. (Cl. 90—13.5)

This invention relates to hydraulically controlled duplicating machines for use in forming the surface of a piece of work in conformity to the surface of a pattern by means of a cutting tool and a pattern controlled tracer. The invention is of a character adapting the same to be utilized in conjunction with a planer, milling machine, lathe or similar structure wherein the machine may be utilized in causing a traverse of the pattern and work by the respective tracer and tool either by movement of the relatively fixed work pattern or of the relatively fixed tracer and tool structure in respect one to the other in a straight line traverse of the pattern and work by the tracer and tool. In conjunction therewith mechanism is utilized to cause a traverse of the work and pattern by the tool and tracer in successive parallel paths until the entire surface of the work has been formed.

The object of the invention is to provide improved hydraulic means associated with the mechanism for performing the above named function for causing the cutting tool, during its traverse of the work in a straight line path, to be moved toward and from the surface of the work in accordance with the movement of the tracer toward and from the general plane of the pattern produced by the configuration of the surface of the pattern along the line traversed to thereby cause the tool to correspondingly cut the surface of the work to conform to the surface of a pattern.

A feature and object of the invention, in addition to the primary object of securing an improved hydraulic control between the tracer and tool functioning to cause the described movement of the tool relative to the work surface traversed, resides in the character and arrangement of parts to cause displacement of a fluid under approximately equal pressure on opposite sides of a piston directly connected with the tool whereby, during the cutting operation, the tool is rigidly held from displacement by cutting pressure in its path of movement toward or from the work as determined by movement of the tracer toward or from the pattern in association with means automatically compensating for leakage of fluid whereby extreme accuracy in machining the parts is avoided.

It is also a feature and object of this invention to provide a head for carrying the tracer and the tool in a fixed relation, provision being made for adjusting the distance apart of the tool and tracer as may be required either by the size or the relative disposition of the pattern and work.

A further important feature and object of the invention is embodied in the tracer structure in which the tracer is movable at an angle to the general plane of the pattern being traversed to cause movement of a tool at an angle to the plane of the work and means in connection with such tracer whereby a side pressure on the tracer, as occurs in the tracer engaging a surface at a comparatively sharp incline to its straight line path of traverse of the pattern, likewise causes a movement of the tool toward or from the work.

It is further an object and feature of the invention to provide a control mechanism by which the plane occupied by the cutting face of the tool is maintained in a positive relation with the plane of the pattern contacting face of the tracer during the cutting operation, the said control mechanism further being operable at will to vary the position of the cutting face of the tool relative to the plane of the pattern contacting face of the tracer to thereby permit the cutter to operate successively in different planes as required in first rough cutting the work and in, the final finish surfacing thereof.

A further object and feature of the invention resides in the provision, in conjunction with the tracer, of an improved piston like valve structure whereby through movement of the tracer toward or from the general plane of the surface of the pattern through variations in the said surface applies hydraulic pressure to the tool to thereby cause the tool to move to a like extent toward or from the general plane of the work being formed.

It is also an object and feature of my invention to provide an improved arrangement of the tracer and tool supports whereby the hydraulically controlled mechanism may be caused to function to move the tool to like degree and in the same direction as the tracer is moved by contact with a pattern or in a reverse direction whereby the surface of the work may be shaped to form either a duplicate of the pattern surface or the reverse thereof as may be required.

These and various other features and objects of the invention are hereinafter more fully described and claimed. The invention in several of its alternative forms is shown in the accompanying drawings in which—

Fig. 1 is a general elevation of a milling machine character of structure embodying my invention.

Fig. 2 is a modified form of such structure.

Fig. 3 is an elevation partly in section showing the invention as applied to a planer, the pattern and work being of like form.

Fig. 6 is an enlarged detail partly in section showing the tracer and the tool assembly of a milling machine type of structure.

Fig. 7 is a cross section of the tool spindle taken on line 7—7 of Fig. 6.

Fig. 8 is an enlarged longitudinal section showing another form of tracer structure and the piston valve arrangement for controlling the application of fluid pressure to the tool holding element.

Fig. 8a is a similar section showing the tracer point in the position assumed when side pressure is applied thereto.

Fig. 8b is a diagram showing in an exaggerated manner the application of side pressure to the tracer, for instance, in the manufacture of dies.

Fig. 9 is a section taken on line 9—9 of Fig. 8.

Fig. 10 is a section taken on line 10—10 of Fig. 8.

Fig. 11 is a section taken on line 11—11 of Fig. 8.

Fig. 12 is a detail on an enlarged scale of a portion of the mechanism for locating the position of the cutting face of the cutter relative to the pattern contacting face of the tracer.

Fig. 13 is an enlarged longitudinal section of a portion of the mechanism for controlling the position of the cutting face of the tool relative to the plane occupied by the pattern contacting face of the tracer.

Fig. 14 is a section of one form of the tracer piston valve.

Figure 4:
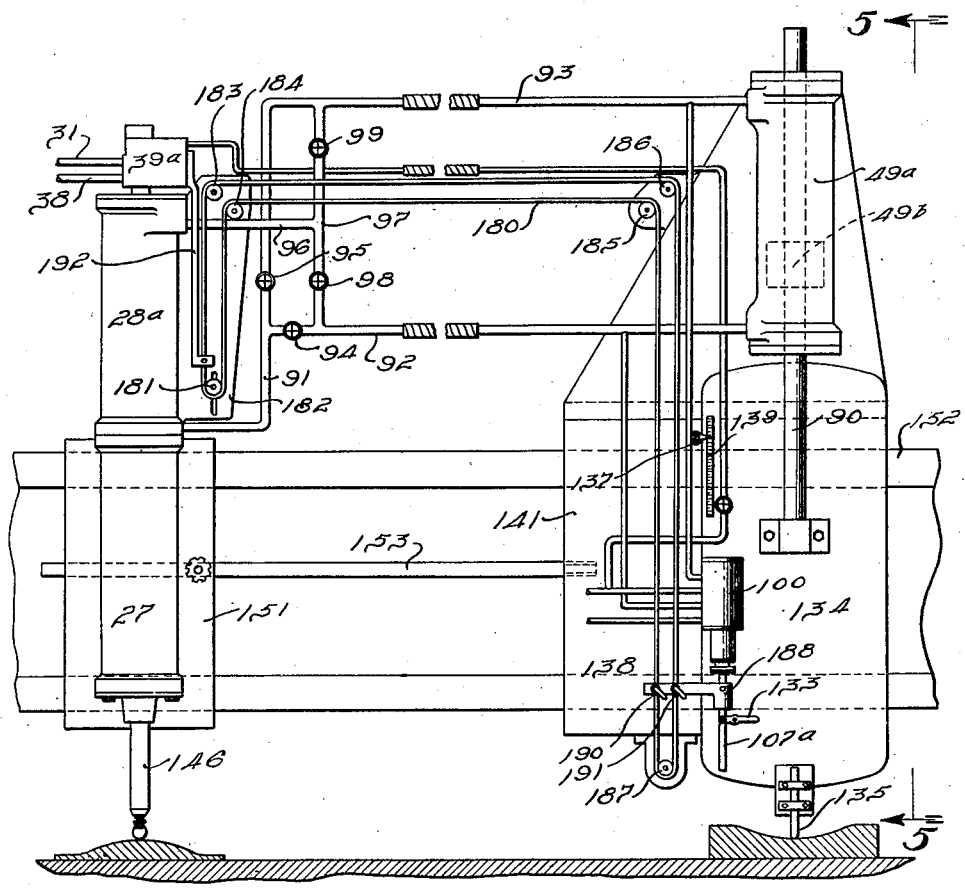
Fig. 4 is a similar elevation of a planer type of structure showing a construction wherein the tool may be made to move in the same direction as the tracer in traverse of a pattern or in a reverse direction to form a female work piece from a male form of pattern.
Figure 5:
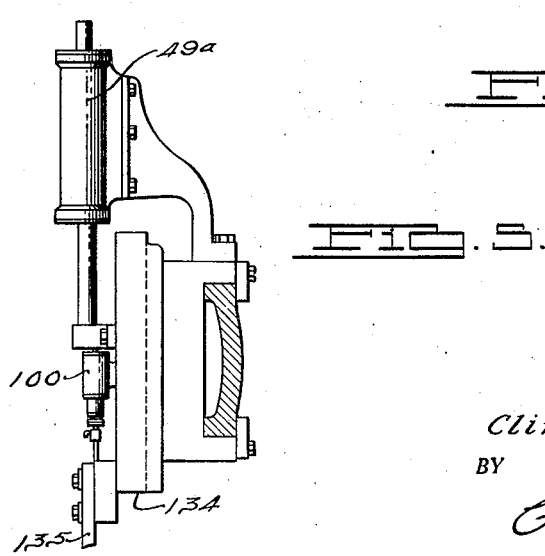
Fig. 5 is a reduced scale section taken on line 5—5 of Fig. 4.

The machine in its entirety is shown more fully in Fig. 1 in which it is applied to a horizontal boring mill and the operation of the tracer and tool in this arrangement of parts, particularly the control of the tool by the tracer in traversing the pattern and the mechanism for effecting such control, is the same in this relationship of the parts as is the case with the structure as applied to a planer of Fig. 4, or other structure having mechanism for causing a relative traverse of the pattern and work by the tracer and tool.

In the boring mill type of structure of Fig. 1 is shown the base member 1, a column 2, a table 3 movable on the base toward or from the column and a slide 4 movable on the table 3 at a right angle to the direction of movement of the table on the base. The table 4 carries what is usually termed an "angle plate" 5 to which is secured a pattern 6 and work 7. The levers 8, 9, 10 and 11 are connected with the usual mechanism for operating the vertical screw shaft 12, for causing movement of the table 3 and on ways 3a of the base, and for moving the slide 4 on the member 3. This is the usual and well known mechanism not here particularly shown, and through one or the other of the control levers the screw 12 or the slide 4 may be moved steadily or step by step. Mounted on a way 13 on the column 2 is a casting 14 which carries the cutting tool 15 and its spindle 16 and by rotation of the screw in one direction or another the casting 14 is moved vertically either upward or downward. As in all such boring mills, the spindle 16 is rotatably supported in the casting or head 14 and there is a driving means for the spindle actuated through a splined shaft 17 rising from the driving mechanism in the base member and power may be applied to such driving mechanism by means of a motor 18.

On the head 14 is mounted a casting 19 having ways on which the base 20, supporting the tracer 21 and associated parts hereinafter described, is slidable. The base 20 is movable vertically to position the distance apart of the tracer 21 and cutter 15. This arrangement is provided to enable the operator to roughly position the pattern and the work as to distance apart and then to accurately set the tracer and the tool or cutter at the same relative points on the pattern and work. This adjustment is secured by means of a manually operable jack screw consisting of a base element 22 fixed to the casting 19 and a screw 23 attached to the base 20 and movable up or down by turning the adjusting nut 24 in one direction or another. Upon the adjustment having been made, the casting 20 may be locked to the casting 19 by the hand clamp 25. The tracer 21 and the cutter 15, through operation of the screw 12, may be moved in fixed relation as to distance apart in a straight line across the surface of the respective pattern and work and, on each traverse and return of the tracer and the tool in the said straight path, the work and pattern are moved a step through movement of the slide 4 for a succeeding cut. Thus by repeated operations the surface of the pattern and work is completely traversed by the multiple series of parallel straight line traverses.

Through the surface configuration of the pattern along the line traversed at each step, the tracer is moved at a right angle to its path of traverse either toward or from the pattern to cause a like movement of the tool relative to the surface of the work. Thus the tool is made to take a varied position in its path of traverse and is caused to form the work to the shape of the pattern. Inasmuch as a rough casting may be cut rather deeply and roughly in the beginning and the depth of the cut changed to take a lesser cut as for instance a very thin finish cut, mechanism is provided to enable the operator to vary the depth of the cut without varying the control of the tool by the tracer. It is likewise to be observed that the pattern and work may be constantly moved laterally relative to the tracer and tool by the slide 4 whereby the actual path of traverse of the pattern and work of the tracer and the tool is transversely of the pattern and work. In such arrangement the screw 12 is operated to cause the step by step positioning of the cutter and tool to take successive parallel paths across the pattern and work. This is desirable due to the fact that some patterns may be worked to greater advantage by a horizontal traverse of the work and pattern rather than a vertical traverse.

As previously stated, the tool is under control of hydraulic pressure whereby the tool is rigidly held in any of its positions against movement through pressure applied to the tool in the cutting operation and this hydraulic actuation and control of the tool will be understood more fully from Figs. 1, 6 and 8.

In Fig. 1 is shown the tracer tube which consists of the sections 26, 27 and 28. Fluid under pressure is provided to this tracer assembly in the following manner:

A supply tank for fluid is indicated at 29, there being an inlet 30 at the top thereof which is in the nature of a bypass from the pump and also an inlet 31 at the bottom thereof through which fluid is returnable to the tank. A pump of any approved type is indicated at 32 having an inlet 33 to the tank, which inlet is screened as by means of the screens 34 from the inlet lines 30 and 31. There is a valve casing 35 to which the pump discharges and this casing has two chambers, the bypass line 30 being open to the upper chamber which is normally closed from the lower chamber by a valve 36 held in seated position by the weight 37 acting on the stem of the valve. A high pressure line 38 leads from the lower chamber of this valve casing 35 and is connected to a head 39 associated with the tracer cylinders.

Through operation of the pump, pressure is applied to the line 38 and to the hereinafter described tracer control mechanism and this valve remains closed until there is sufficient pressure in the chamber 36 and the conduits connected therewith to lift the weighted valve from its seat and thus by-pass liquid from the pump in volume depending upon the position of the valve 36 relative to its seat. The relationship of these parts is such as to provide pressure to the hydraulic system of the tracer and tool assemblies to perform the desired functions and to maintain that pressure constant at all times. It is to be realized that, if there is no movement of the tracer in a direction toward or from the pattern and therefore no movement of the tool in a direction toward or from the work, there can be no flow of fluid in the tracer or tool assembly or conduits connecting the same. Upon the tracer encountering a surface causing the tracer to be moved in a direction at a right angle to the general plane of the pattern in one direction or the other, a demand for fluid pressure is set up to effect the control of the tool and this demand continues depending upon the extent of displacement of the tracer through variation in the surface shape of the pattern in the path of its traverse of the pattern. This valve pump arrangement is such as to provide a sufficient quantity of liquid under pressure to satisfy the demand of the hydraulic system for pressure of fluid but as the capacity of the pump is greater than any possible demand there is always some by-passing of liquid from the pump to the line 30.

In Fig. 6 is shown the hydraulic control mechanism of the tracer and tool assemblies, and it will therein be seen that the head 39 is recessed at its inner end toward the tracer section 28 into which is fixed a tube 40. This tube is open to the recess in the head 39 and to which recess the high pressure line 38 is connected. Thus high pressure fluid is provided in the interior of the tube 40. The tube 40 at its opposite end is directly connected to the piston indicated generally at 41 in Fig. 6 and shown in section in Fig. 8. It will be observed that, by movement of this piston 41 in its tube section 27, the tube 40 and the head 39 are moved outwardly or inwardly of this tracer tube assembly, the lines 38 and 31 having a flexible connection or provided with slip joints to permit such movement. Also within the tube 40 is a second tube 42 which extends into the head 39 to an extent beyond the bottom of the recess receiving the tube 40 and is thereopen to the low pressure line 31 which is connected to the bottom of the tank as shown in Fig. 1. This tube 42 at its opposite end is connected to the head of the piston assembly as shown in Figs. 6 and 8 and fluid from the high pressure tube 40 may pass to the low pressure tube 42 and discharge through the line 31 to the tank as is hereinafter described. The tube 40 at the outer end of the tracer tube section 28 is packed as shown by means of a double packing 43.

The tube sections 27 and 28 are separated by the two sets of double packing rings 44 engaging the tube 40 to prevent any passage of fluid from the interior of the section 28 to the interior of the section 29. The outer end of the tracer section 27 is also packed at 45 and the tube section 26 is supported in the end of the tube section 27 by a sleeve 46 by which it is rigidly held from displacement laterally. The tracer tube 26 is secured to the piston element as indicated in Figs. 6 and 8.

In Fig. 6 the cylinder 28 of the tracer assembly has a piston 47 secured in any approved manner to the tube 40 as shown clearly in Fig. 6 and through movement of the tracer 21 in a direction longitudinally of the tube 26, fluid pressure is applied to move the piston 41 in one direction or the other of the longitudinal axis of the tube 27 depending upon the direction of movement of the tracer determined by the configuration of the pattern being traversed. This will move the tube 40 outwardly or inwardly of the tube section 28 and as the cylinder 28 is filled with oil on the exterior of the tube 40, this oil will, on movement of the piston 47 to the right of Fig. 6, cause oil to pass out through the line 48 to the lower end of the cylinder 49 and to the under side of the piston 50 therein secured to a tube 51 reciprocable in the cylinder 49. This will cause the tube 51 to move in the same direction and to the same extent, if the cylinders are of the same internal diameter, as the tube 40 is moved through actuation by the tracer.

With fluid passing through the tube 48 to beneath the piston 50 the oil, with which the cylinder 49 is also filled, is caused to pass through the line 52 to beneath the piston 47 in the tube 28. Thus with the closed circuit arrangement described, the piston 50 is rigidly held at any point of its movement under hydraulic pressure. The cylinder 49 is mounted upon a tubular casting 53 extending outwardly from the head 14 shown in Figs. 1 and 2 and through the hollow interior of which the spindle 16 of the tool extends and is reciprocable. As previously stated, the spindle 16 is supported from lateral displacement in the usual manner with structures of this character in the head 14 in which the mechanism for rotating the spindle is provided. In order that the tool may be moved to the same degree and in the same direction as the tracer is moved by reason of the configuration of the pattern, the tube 51 of the tool spindle control structure extends outwardly of its cylinder 49 and is there attached to a block or head 54 which in turn has a portion extending through a slot 55 in the tubular extension 53 and secured to a tubular ram 56. Within this ram 56 is a tubular member 57 flanged at each end as indicated and similar thrust bearings 58 are interposed between the ends of the ram and the respective flanged ends of the member 57.

This flanged member 57 is fixedly secured to the spindle as by means of one or more screws 59 and while this member 57 is therefore rotatable with the spindle, the ram 56, which is of the nature of a sleeve, is held from rotation through the fixed attachment of the ram to the head 54 of the tube 51. Thus as the tube 51 is caused to move in one direction or the other of its longitudinal axis, the spindle 16 and likewise the tool is moved.

Movement of the tube 40 of the tracer assembly is occasioned in the following manner:

The tracer member 21 in moving over the pattern, indicated at 6a and due to the shape of the face of the pattern, causes the tracer element 21 to be moved to the right of the position shown in Fig. 6. It is firstly to be noted that the tracer point 21 is fixed to the end of the longitudinally movable shaft (see Fig. 8) riding in a tubular structure 61, which structure has a ball like portion 62 intermediate its ends seating in a ball recess formed in two complemental members 63 and 64 threaded in the tube 26. The member 63 is seated against a centrally apertured disc 65 and the member 64 is threaded to permit it to be turned down onto the ball like portion to make a comparatively tight fit and yet permit ready turning of the ball in the recess formed between the two members 63 and 64 when occasion demands as is hereinafter described.

To the shaft 60 is connected a rod 66 which extends through a side pressure control mechanism indicated generally at 67 in Fig. 6 (hereinafter described) and thence through a tube 68 connected directly to the lower end of the piston 41 in the tube section 27. This rod 66 is flexible to permit limited lateral movement of the tracer point due to side pressure hereinafter described and at the upper end, that is, the end extending through the end 69 of the hollow piston 41, is secured directly to a piston valve 70 which has limited longitudinal movement within the piston 41. The inner wall of the piston 41 is provided with a pair of spaced cylindrical grooves 71 and 72 and the piston valve 70 has the flanged ends 73. The over-all length of the piston valve 70 is somewhat less than the distance between the ends of the piston ends or heads 69 and 74. These flanges are apertured to permit fluid to pass from either end of the valve through the said apertures into the groove 75 on the one end or 76 on the other between the respective flanged end and the rings 77 and 78 on the body of the valve and spaced apart practically exactly the same distance the grooves 71 and 72 of the piston wall are spaced and aligning with and closing the same as shown in Fig. 8. There is also a groove 79 in the valve between the two rings 77 and 78. These rings 77 and 78 closely fit the inner wall of the piston 41. The piston valve 70 also has, as shown in Fig. 11, a series of longitudinal apertures 80 opening through the ends thereof and opening by the lateral passageways 81 and 82 to the ring grooves 75 and 76.

The heads 69 and 74 of the piston 41 have the respective longitudinal apertures 83 and 84 which open respectively to the tubes 68 and 42. The head 74 of the piston has a passageway 85 extending through the cylindrical wall of the piston and opening through the head 69 and thus providing the passageway from the interior of the tube 40 to the exterior of the tube 68 within the cylinder section 26. The passageway 85 also has intermediate its ends a small passageway 86 opening through the cylinder wall to the groove 79 between the rings 77 and 78 of the piston. Likewise the ring groove 71 of the cylinder wall is open by means of a passageway 87 in the piston wall and head 74 to the exterior of the tube 40 in the cylinder 27 and the groove 72 has a passageway 88 opening through the head 69 of the piston to the cylinder 27.

As previously stated, there is high pressure fluid within the tube 40 delivered thereto by the high pressure line 38 as will be understood from Fig. 1 and thus high pressure liquid is delivered in the tube 40 on the exterior of the tube 42 in the passageway 85 and in the space within the tube section 26 exteriorly of the tube 68 and high pressure also due to the small opening 86 exists in the groove 79 of the piston valve. Normally, the position of the piston valve is as shown in Fig. 8 and movement to the right of the tracer element from the position shown in Figs. 6 or 8, due to the tracer encountering a raised portion of the pattern 6a, moves the piston valve slightly toward the right and opens the groove 71 of the piston wall to the groove 76 of the valve and also opens the groove 72 in the piston wall to the groove 79 of the valve.

In this position the high pressure oil in the groove 79 passes into the groove 72 and thence through the passage 88 to the bottom or left side of the piston 41 which causes the piston to move upwardly carrying with it the tube 26 and the tube 40. Thus pressure is applied to the bottom of the piston to force it to the right of the position shown in Fig. 8 and the oil above the piston in the tube 27 may pass through the passageway 87 to the groove 71 of the piston wall into the groove 76 of the valve and through the apertures 82 into the longitudinal aperture 80 and thence through the passageway 84 in the piston head to the interior of the low pressure tube 42 through which it is returned to the head 39 carried by the tube 40 and to the line 31 to the tank.

The tracer 21 is spring-supported relative to the tube 61 in which the tracer shaft 60 is slidable and as the tracer has a slight movement at a right angle to the pattern in traversing an upwardly inclined pattern surface and thus causes the piston valve to open, fluid is applied to the under side of the piston 41 and the entire assembly is moved by the piston. If the tracer engages a surface of the pattern lying in a plane at a right angle to the axis of the movement of the tracer assembly, herein sometimes termed a "neutral plane", the piston valve will close the ports of the piston and thus the piston and tracer will remain in a stationary position. If the pattern surface has a depression below this neutral plane, the spring 89 will move the tracer and rod in a direction toward the pattern and thereby move the valve to open the groove 72 to the groove 75 and apply pressure to the outer side of the piston 41 and thus move the entire tracer assembly in a direction toward the pattern.

Under this position of parts, oil below the head 69 of the piston 41 in the cylinder 27 may pass through the passageway 88 to the grooves 72 and 75 and thence outwardly through the channel 80 of the valve to the low pressure tube 42. Also the high pressure from the valve groove 79 will pass through the ring groove 71 in the piston wall and thence through the passageway 87 to the upper side of the piston and thus force the piston to the left of the cylinder from a position that it may occupy therein. In Fig. 8 the piston 41 and valve arrangement is shown approximately at the limit of its movement to the left but this piston may occupy any position within the length of its cylinder 27 and, as this tube 40 is connected fixedly with the piston 47 in the tube section 28, as shown in Fig. 6, it will be moved in one direction or another of its cylinder and cause a transfer of oil from one side of the piston 50 of the tool control element and released from the other but under rigid control at all times due to the fact that the two cylinders 28 and 49 and the tubes connecting the same are filled with liquid. I have also found it preferable to use a small aperture 86 to cause the high pressure oil to feed comparatively slowly and without shock whereby the movement of the parts is free and easy as it has been found in practice that much larger feed apertures to the piston element develop chatter in the tool.

It will be understood from this general description of the operation of the tracer and the connection of the tool spindle with the tube 51 controlled in position by the piston 50 that any movement of the piston valve 70 will cause a transfer of high pressure to one side or the other of the piston 41 and cause movement thereof depending entirely upon the length of time the piston valve has opened one or the other of the grooves in the piston wall to the central groove 79 of the piston valve. This, of course, will depend upon whether the pressure continues to be exerted on the tracer 21 tending to move it to the right or left through with a pattern surface, or to the left due to the spring 89 engaging a depression in the pattern surface below a neutral plane of the pattern. Thus the tool will be caused to move exactly in the same manner and to the same extent in a direction toward or from the surface of the work and thereby forming the same to correspond exactly with the pattern surface when the work has been completed. It will be understood from a former statement herein that the work surface may have to be traversed a number of times until it has been worked down to a finished surface.

The apparatus may be made to so operate that the tool moves in a direction opposite to the direction of movement of the tracer and thus form a surface the reverse of the surface of a pattern as may be required in the making of a female die from a male pattern. This is illustrated in Fig. 4 which shows the same general tracer and tool control cylinders.

In Fig. 4 the tube section 2d$^a$ corresponds to the tube 28 of Fig. 6 and the tool control includes a cylinder 49$^a$ having a piston 49$^b$ therein to which is connected a shaft or tube 90. The conduits connecting the cylinder 28$^a$ with the cylinder 49$^a$ consist of a line 91 leading from one end of the cylinder 28$^a$ and to this line 91 is connected a line 92 leading to the bottom of the cylinder 49$^a$ below the piston 49$^b$. A line 93 leads to the top of the cylinder 49$^a$ above the piston therein and in the line 92 is a valve 94 which may close the line 92 to the line 91 and in the line 91 is a valve 95 which may close this line 91 to the line 93. From the top of the cylinder 28$^a$ leads a line 96 which opens to a cross line 97 extending between the lines 92 and 93 on opposite sides of the point of connection of the line 96 with the line 97 are the respective valves 98 and 99. The piston in the cylinder 28$^a$ corresponds to the piston 47 in the cylinder 28 shown in Fig. 6 and thus in this view Fig. 4, movement of the piston in the cylinder 28$^a$ upwardly in the position of the parts shown will cause oil to pass through the line 96 into the line 97 through the valve 99 to the line 93 to the top of the piston 49$^b$ whereby upward movement of the piston in the cylinder 28$^a$ produces downward movement of the piston in the cylinder 49$^a$. Conversely, if the valves 95 and 98 be opened and the valves 94 and 99 be closed, upward movement of the piston in the cylinder 28$^a$ will cause oil to pass through the line 96 through the valve 98 and line 92 to the bottom of the cylinder 49$^a$ and thus cause the tool to move upwardly as the tracer moves upwardly. Thus by this cross-over arrangement of the closed hydraulic circuit between the two cylinders 28$^a$ and 49$^a$ the work may be formed to correspond exactly to the pattern or to produce a shape the reverse thereof.

In any of the structural forms in which this invention may be embodied and associated with mechanism for producing the relative traverse of the pattern and work by the tracer and cutter, it is desirable, if not necessary, to provide a means for compensating for leakage even with very finely machined parts. Leakage even though minute eventually will result in a reduction in the necessary oil pressure and thus to correct such discrepancies in operation as might thus occur and also to avoid the expensiveness of very fine workmanship in the fitting of the parts etc., I have provided a means to compensate for leakage of oil or air pockets as may occur in the system which otherwise might result in an improper positioning of the cutter in respect to the surface being traversed. To accomplish this result, I have provided what I have termed a "compensator" 100 which, as shown in Fig. 6, may be mounted on the head 54 of the tool actuating shaft 51 to which the piston 50 is secured as shown in Fig. 6. This element 100 consists of a cylinder 101 having ring grooves 102 and 103 in its inner wall and a piston valve 104 is reciprocably supported in the cylinder which has a head 105 at one end and a head 106 at the opposite end through which extends a shaft 107 threaded into the hollow end of the piston valve 104. There is a guide block 108 threaded into a cylindrical extension of the head 106 to adjacent the aperture therein through which the shaft extends to engagement with the piston and in this chamber is a cupped packing ring 109 to prevent leakage of oil along the shaft.

Into the outer end of this hollow extension of the head 106 is threaded a cage 110 and this cage has in its bottom an opening in which is a split disc 111 which has a central opening to receive a reduced diameter portion 112 of the shaft. The disc is of the same width as the thickness of the apertured wall of the cage 110 receiving the same. The disc is supported in place between the shoulders formed by the larger diameter portions of the shaft 107 and on opposite faces of the disc and of the member 110 adjacent thereto are washer like members 113 and 114. A spring 115 seats at one end on the guide block 108 and engages the washer 113 at the opposite end and there is a spring 116 engaging at one end against the washer 114 and against a closure plate 117 on the cage 110. The springs are approximately of equal tension and thus hold the split disc 111 centrally disposed in the aperture in the base of the cage. Under this condition the ring-like members 118 and 119 on the piston valve 104 are aligned with the grooves 102 and 103 in the cylinder wall closing the same to the interior of the cylinder. There is a high pressure line 38$^a$ which is connected to the high pressure system in any convenient manner as by connection to the line 38. This line 38$^a$ opens to the cylinder between the rings 118 and 119 of the piston valve through a small aperture 123.

By movement of the shaft 107 to the right of Fig. 13 the ring groove 103 is open to high pressure in the line 38$^a$ and this pressure will feed out through the conduit 124 to the conduit 48 and thus apply high pressure liquid to the right end of the piston 47 in the cylinder 28 and to the left end of the piston 50 in the cylinder 49.

On movement of the shaft 107 in the opposite direction, that is, toward the left of Fig. 13, the ring groove 102 is opened to the high pressure line 38$^a$ and this would feed through the conduit 125 to the line 52 to the left side of the piston 47 in the cylinder 28 and the right side of the piston 50 in the cylinder 49. There is also a low pressure line 121 opening through a small aperture to the cylinder 100 adjacent one end thereof as shown in Fig. 13 and this line is to be understood as being connected by a line 126 to the low pressure line 31. A line 126ᵃ connects to the low pressure line 121 and has a valve 122 (Fig. 6) from which a line 123 extends to one of the conduits 48 between the cylinder 28 and the cylinder 49 and a conduit 123ᵃ leading to the conduit 52 extending between the opposite ends of the two said cylinders. This valve 122 may be turned to open the conduit 126ᵃ to both conduits 48 and 52 of the cylinders 28 and 49 and thus to both sides of the pistons 47 and 50 in the said cylinders. This valve 122 is utilized in filling the cylinders and providing for relief of pressure when varying the spacing of the tool and tracer assemblies. This compensator mechanism described may be actuated automatically to maintain the two cylinders and conduits filled with liquid to compensate for leakages, air pockets etc., and this may be accomplished by means of an arm 127 which has a slotted end 128 in which is carried a slidable block 129 having an aperture for the shaft 107 and a handled screw 130 for fixedly clamping the block 129 to the shaft 107.

Due to the necessity of varying the distance apart of the tracer and tool assemblies, it is necessary to provide the slotted arm 128 to accommodate this variation in position of the two main elements of Fig. 6. As this arm 127 is attached to the head 39 reciprocable with the tube 40 and the compensator assembly 100 is attached to the bracket 54, there will be no relative movement of the arm 127 to the compensator cylinder as the pistons 50 and 47 move in a fixed relationship. If, by leakage in one cylinder or the other on one side or the other of the pistons so that there is a tendency for one piston to be out of step with the movement of the other, then the arm 127 moves the shaft 107 in one direction or the other and applies fluid to one side or the other of the piston 50 of the tool control to correct its position in respect to the piston 47 attached directly to the control piston 41 of the tracer assembly. The high pressure line 38ᵃ also has a valve controlled conduit 38ᵇ which opens into the head 39 which has a cylinder 130ᵃ opened by a conduit 131 to the low pressure line 31. In this cylinder is a piston 132 beneath which this line 38ᵇ opens. The cylinder 132 is on the terminal end of the tracer rod 66 connected with the tracer 21. Thus, by opening this valve permitting high pressure oil to flow from the high pressure line 38ᵃ to the left side of the piston 132, the tracer point may be moved from contact with the pattern. As this chamber at the left of the piston 132 has an aperture slightly longer than the tracer shaft 66 and is not packed against leakage to the low pressure line 31, the high pressure will very readily deplete to the low pressure line 31 on the closing of the valve in the line 38ᵇ.

This compensator device may also be used to move the tool from the work or re-position the same as the work is being formed by successive traverses across its surface as in the making of a deep or a lighter cut. This is accomplished in the following manner:

The shaft 107ᵃ of the compensator, as shown in Fig. 12, has a pin 132 engaging in the slotted end of a pivoted lever 133 which may be supported in a fixed relation with the compensator. As for instance, as shown in Fig. 4, it may be mounted on the tool head or slide 134 to which the tool 135 is connected at the bottom. The compensator, as shown in Fig. 4, is actuated in a slightly different manner than the same compensator shown in Figs. 1 and 6 but the same control lever is to be used in relation with either compensator arrangement. In the construction shown in Fig. 1 a bracket 136 may be carried from the head 54 carrying the compensator and to which the lever 133 is pivoted. The rod 107 of Fig. 13 or 107 of Fig. 13 or 107ᵃ of Figs. 4 and 12 may be moved by moving the lever 133 in a direction to move the piston 119 to the right of Fig. 13. This would cause high pressure fluid to pass through the line 124 to the line 48 and to beneath the piston 50 and this will raise the shaft 51 and the tool spindle 16 attached thereto by the head 54 (Fig. 6). To accurately position the tool, a gauge is provided which consists of a pointer 137 on the base 138 shown in Fig. 4 or 48 shown in Fig. 3 and thus is in a stationary position relative to the tool head or slide 134. On the slide are the graduations 139 to enable the operator to position the tool very accurately as may be required for the various degrees of cut to be made in the work.

Thus the tool can be set with its cutting face at the proper point to make a rough cut in the work and after the work has been traversed by the successive parallel line movement of the cutter, the work is again surfaced in the same manner by dropping the tool to the desired degree. Thus not only may the tool be raised from the work by the lever 133 but it may be lowered to successively lower positions and this term "raised and lowered" is used in respect to the vertically positioned tool and tracer of Fig. 4. In the form shown in Fig. 1, the tool may be moved toward or from the work in a horizontal plane by this same character of lever. When changing the tool position, the clamp (Fig. 13) must be released thus releasing the shaft 107 to permit the compensator assembly to move with the head 54 connected with the tool spindle.

In a considerable part of the work to be performed, the tracer need only be moved in a direction solely at a right angle to the path of the tracer on the pattern. This tracer arrangement is shown in Fig. 3 which is of the planer type of construction in which there is a slide 140 carried on a base 141 and to the lower end of the slide is secured the tool diagrammatically shown at 142. On this base is secured a tubular shaft element forming the shaft of a piston 144 in a cylinder 145. On the tracer tube 26 is a piston 147 similar in all respects to the piston 41 in Fig. 8. The piston 147 is operable through movement of the tracer point 21ᵃ and shaft 146 relatively longitudinally of its supporting tube 26. By this piston 147, as is the case with the structure shown in Fig. 8, liquid under pressure is applied to one side or the other of the piston 148 and by the cross-over lines 149 and 150 fluid is taken from one side of the piston 144 and applied to the other side to thereby move the tool in accordance with the movement of the tracer.

This tracer 21ᵃ of Fig. 3 is spring-supported relative to the tubular element 26 in which the tracer shaft rides and functions in the same manner as described relative to the movement of the tracer point 21 of Fig. 8. In the construction shown in Fig. 3, the base 141 for the tool slide and the base 151 carrying the tracer assembly are slidable in fixed relation on the cross rail 152 of the planer and the distance apart of the tracer base and the tool base 141 is secured by means of a rod 153 attached to the base 141 and slidable in relation to the base 151. A hand screw 154 is provided for fastening the two parts in the adjusted relationship, it being understood of course that the pipe lines are provided with slip joints, as for instance the slip joint 155, permitting any required adjustment as to distance apart of the tracer and the tool. The tracer piston 147 of Fig. 3 is shown in Fig. 14 in longitudinal section and the tracer piston valve 156 is exactly like the tracer piston valve of Fig. 8 except the passageway 157 leading from the high pressure tube 158 to the groove 159 of the piston valve does not extend therebeyond and into the tube section 26 as does the passageway 85 shown in Fig. 8 but the actuation of the piston valve and the distribution of pressure fluid described relative to the piston 41 of Fig. 8 is identical in other respects.

The extension of the passageway 85 of Fig. 6 to carry high pressure fluid into the tracer tube 26 is utilized to provide movement of the tool due to side pressure on the tracer and such arrangement is not required in the construction shown in Fig. 3 in which the tracer has no possible side movement but is restricted solely to movement longitudinally of the axis of the supporting shaft 146.

The structure indicated generally at 67 in Fig. 8 and in Fig. 8ª is utilized to actuate the tool through side pressure on the tracer point. In Fig. 8ᵇ particularly it will be noted that the tracer in traversing the line 160 of a pattern will, as it reaches the sharply and upwardly inclined surface 161, have pressure applied thereto in the direction as shown by the arrow which turns the tracer slightly due to the ball and socket mounting. This movement is exaggerated in Fig. 8ᵇ and it is pointed out that the portion 66 of the tracer rod is sufficiently flexible to permit the tubular portion 61 in which the tracer shaft 60 is slidable to turn to a slight degree one side or the other of the longitudinal axis of the tube 26. This movement throws the upper end 61ª of the structure 61 to one side or the other of the normal central position. This upper end 61ª is positioned in a central aperture of a block 162 which is secured in position in the tube 26. This block has four radial recesses 163 shown in Fig. 9 open to the exterior of the block 162 and at the inner ends having apertures to receive a cylindrical end of the headed pins 164 which project into the central recess of the block 162 and engage the cylindrical end 61ª of the tubular element 61 and normally hold the longitudinal axis of the tube 61 in alignment with the axis of the tube 26.

This block 162 has a recess in its face at the right hand side of Fig. 8 to receive the valve plate 165 and forms one part of the side pressure control mechanism. The other part of this control mechanism is formed by the block 166 which has a terminal end portion 167 at the right hand end to which the tube 68 is secured and these blocks are held in abutting relation by reason of the block 166 fitting against a shoulder in the wall of the tube 26 at the right hand side while the portion 162 is supported from displacement by a tube 168 lying between the apertured block 65 and the block 162. Movement of the piston 41 due to its direct connection with the block 167 carries with it the tube 26 which is slidably supported in the end portion 46 of the cylinder section 27. Thus, when the tracer is moved to the right from the position shown in Fig. 8, such movement of the tracer relative to the tubes 61 and 26 first moves the piston valve 70 of the piston 41 and applies a hydraulic pressure to move the piston 41 and tubes connected therewith to the right by application of pressure beneath the piston 41 until the tracer, due to the surface shape of the pattern, reassumes the relation with the tube 61 as shown in Fig. 8 wherein movement of the piston in the cylinder 27 ceases. This is the normal action of this tracer element when no side pressure is applied. In fact the tendency of this structure normally is to assume the relative position of the parts shown in Fig. 8 with the piston of the cylinder 41 closed by the piston 70.

In order that the tool will properly move when the tracer for instance "climbs a hill" as indicated in Fig. 8ᵇ, side pressure is produced thereon before end pressure is produced and it is necessary that the tool begin to take the same angular direction in relation to the work before the center axial point of the tracer reaches the inclined surface. Thus the rod 66 is made flexible to permit the tubular element 61 having the ball joint 62 to turn on the axis of the ball to an extent such as is suggested in Fig. 8ª. To produce movement of the piston 41 by the side pressure is the purpose of this structure generally indicated at 67 and termed "side pressure control device". For this purpose the block 166 of the control device 67 has a central cylindrical aperture 169 in which is a piston 170 slidable on a reduced portion of the rod 66 and at its right hand end may engage a shoulder 171 on the rod 66. As before stated, there is a channel 85 leading from the high pressure tube 40 through the body of the piston 41 and opening to the space in the tube 26 around the tube 68. The block 166 has a passageway 172 extending therethrough which opens against the face of the slide valve 165 by a circular groove 172ª. There is also a branch channel 173 opening to the passageway 172 and to the bottom or left side of the valve disc recess in the part 162 by a circular groove 174. There is also offset from the passageway 173 a passageway 175 which opens to the recess in which the valve plate 165 is positioned beyond the periphery of the valve when in its normal position, as shown in Fig. 8, and in which normal position the valve closes the passageway 172 and groove 174 to the valve recess at the one end and to the cylinder 169 below the piston 170 therein at the opposite end.

This piston 170 is loose on the shaft portion 66 within the cylinder and when the disc valve 165 is moved to the position shown in Fig. 8ª, high pressure oil is discharged to the left side of the piston 170 forcing it to engagement with the shoulder 171 on the portion of the tracer rod 66 within the piston chamber 169. This movement of the rod therefore is upwardly by hydraulic pressure either by direct pressure on the end of the tracer tending to move it in a direction axially of the cylinder 26 and is also occasioned by side thrust on the tracer under the condition shown in Figs. 8ª and 8ᵇ. It is also to be noted that by means of the cylindrical grooves 172ª and 174 that hydraulic pressure is applied to both sides of the disc valve therefore balancing the same and permitting freedom of movement in its recess. There is also a small aperture 176 from the passageway 172 to the piston chamber 169 at the right hand end of the plunger and also a passageway from the same end of the cylinder at 177 to a low pressure conduit or pasageway 178 which opens to the interior of the tube 68 and thence to the low pressure line 31. This passageway 178 at the opposite end opens to the recess in the block 162 so that any leakage of oil into the chamber a at the left side of the block 162 is discharged to the low pressure tube 68. This prevents an accumulation of pressure in the said chamber a and reduces liability of leakage about the ball 62. The chamber at the rear left side of the piston 170 has a small diameter aperture 179 opening to the low pressure passageway 178.

Normally and in the position of the parts shown in Fig. 8, the end of the piston 170 is out of contact with the shoulder 171 on the rod 66. This is due to the fact that there is a constant leakage of oil from the high pressure conduit 172 into the forward end 169 of the cylinder and discharging through the aperture 177 to the low pressure passageway 178. There is the same result to be attained at the rear end of the cylinder by means of the conduit 179. Subsequent to an impulse produced by discharge of high pressure oil into the cylinder at the left end of the piston and movement of the piston to the right as shown in Fig. 8ᵃ to engagement with the shoulder 171. This high pressure, upon the disc valve 165 returning to normal position, will deplete to the low pressure passageway 173 and thus permit the piston to be moved from its position shown in Fig. 8 to a position out of contact with the shoulder 171 until it is again being actuated through side thrust on the tracer 21.

Referring again to Fig. 4, this view, as before stated, shows a planer structure embodying my invention and the closed circuit between the cylinders 28ᵃ of the tracer assembly and the cylinder 49ᵃ of the tool assembly has previously been described whereby the tool is made to cut the work directly corresponding to the pattern or the reverse of the pattern surface shape.

In the machine as set up to be operated to secure either of such results, it is necessary that the compensator shaft 107ᵃ of Fig. 4 be moved in one direction when the work is cut in conformity with the pattern to apply the high pressure oils to the proper ends of the cylinders 28ᵃ and 49ᵃ for maintaining the same, including the cross-over lines 91, 92 and 93, properly filled with liquid and to be operated in the reverse direction when the circuit between the cylinders 28ᵃ and 49ᵃ has been changed to produce movement of the tool in a direction opposite to the direction of movement of the tracer to contact with the pattern. This may be accomplished by means of an endless tape or cable 180 which runs about a pulley 181 supported on a bracket 182 secured to the cylinder 28ᵃ. There is also two sheaves 183 and 184 also carried by this bracket. The cable thence passes over the sheaves 185 and 186 attached to the base 138 on which the tool slide is mounted and the cable extends downwardly therefrom and passes about a sheave 187 at the bottom of the said base 138 and adjacent to the compensator 100. In this case the compensator is movable by means of an arm 188 attached to the shaft 107ᵃ as by means of a screw 189 shown in Fig. 12. This arm has two apertures or ways for the cable and clamping screws 190 and 191 are positioned to be tightened against one or the other portions of the cable running therethrough to thereby fix the arm to one or the other reversely running cable position.

Thus when the head 39ᵃ is moved outwardly of the cylinder 28ᵃ the cable is moved by means of an arm 192 attached to the head 39ᵃ and to the cable adjacent the pulley 181. This causes the cable to be run over the sheaves and, depending upon which of the clamps 190 and 191 engage the oppositely running portions of the cable, the compensator shaft is correspondingly actuated. It is also pointed out that in the planer structure of Fig. 4, I have not shown the cross feed screw mechanism associated with the cross rail 152 as such feed screws are in common use and include mechanism for causing the screw to feed the bases supporting the tool and tracer assemblies in a fixed spaced relationship or to move toward or from each other at each traverse of the work and pattern. This is utilizable to cause the tracer and tool to be moved toward or from each other in successive traverses of the respective work and pattern, and thereby form a female work surface from a male pattern as required in die work.

The boring mill structure or other type of structure with which the invention may be associated may be likewise arranged to secure movement of the tool toward or from the work in the same direction as the tracer is moved toward or from the pattern or in a reverse direction from such tracer movement.

The machine so far described embodies a cylinder in each of the tracer and the tool assemblies connected together by conduits and providing a closed hydraulic circuit as described causing movement of the tool toward or from its work by movement of the tracer toward or from the pattern. This arrangement provides an efficiently operating mechanism and secures a rigid control of the tool at any point of its movement toward or from the work surface.

A like efficient result may be obtained by the arrangement of the parts as shown in Fig. 2. In this structure the head 39ᵇ of the tracer structure is the same as the arrangement shown in Fig. 1 there being a high pressure line 38ᶜ to the head from the pump 32ᶜ and a low pressure line 31ᶜ which leads to the tank 30ᶜ. There is also a conduit 193 leading from the high pressure line 38ᶜ to a head 194 on the tubular shaft 195 of the tool control cylinder 196 and from this head leads a line 197 to the low pressure line. The head 39ᵇ is open to the tubular tracer element 40ᶜ corresponding in all respects to the tube 40 of Fig. 1 and the tube 195 of Fig. 2. The head 194 of the tool controlling element is practically identical with the head 39ᵇ. The tracer cylinder 27ᶜ corresponds to the section 27 of the tracer assembly shown in Fig. 6 and has therein a piston 41ᶜ exactly like that shown at 41 in Fig. 8 whereby movement of the tracer at a right angle (or by side thrust if the tracer assembly is constructed to include the same) causes movement of this piston 41ᶜ in its cylinder 27ᶜ. There is a rod 198 connecting the head 39ᵇ with a shaft 199 of the tool control structure which includes a piston and valve arrangement 200 identical in all respects with the piston 41ᶜ of Fig. 2 or 41 of Fig. 8. Thus movement of this rod 199 in one direction or the other results in the application of hydraulic pressure to one side or the other of the piston 60 identically as is caused by movement of the tracer to apply pressure to one side or the other of 41ᶜ of Fig. 2 or 41 of Fig. 8.

Thus any movement of the piston 41ᶜ of Fig. 2 to the right or left of the position shown in Fig. 2 will cause a like disposition of the piston 200 in the cylinder 196. The tubular shaft 195 extends through the right hand end of the cylinder 196 and is there secured to a block 201 which is attached to the ram 202 on the tool spindle 16ᶜ which is practically exactly the same ram arrangement as shown in Fig. 6. Thus movement of this piston 200 in one direction or the other under hydraulic pressure moves the tool corresponding to the movement of the tracer. In effect the rod 198 practically provides a continuation of the tube 40ᶜ of the tracer but due to the greater convenience in construction, the cylinders are offset as shown and connected by a rod. There is also a valve controlled conduit 203 leading from a high pressure line to the head 39ᵇ in the same manner and for the same function as the line 38ᵇ of Fig. 6, that is, to supply oil beneath a small piston to lift the tracer from the work.

The adaptability of the invention to various classes of work and in association with various types of machines such as planers, boring mills etc., is believed evident from the foregoing description, it being pointed out that while there is a change in the positioning of the parts for association with the several types of machine structures adapted to be utilized therewith, the features and objects of the invention are embodied in each of the structures.

By the general arrangement of the parts described particularly the controlled movement of the tool toward or from a work piece by movement of a tracer toward or from the pattern, the tool is rigidly held from displacement by the cutting pressure and yet is movable instantly with the tracer to the same extent and either in the same direction or in a reverse direction as the tracer movement toward and from the pattern, it being understood of course that the traverse of the pattern and the work is produced by the machine and that the hydraulic control mechanism and various parts thereof are effected only through movement of a tracer toward or from the pattern or by side pressure applied to the tracer point. Therefore a very smooth and accurately finished piece of work may be secured by this hydraulically controlled mechanism requiring, upon completion of the cutting operation, a mere polishing of the work surface to free the same from tool marks.

It is also to be understood that various changes in the structure and relationship of the parts may be made as may be required in various characters of installation and with various types of machines with which the tool and tracer assemblies are to be associated without departing from the spirit of this invention as set forth in the appended claims.

Having thus fully described my invention, its utility and mode of operation, what I claim and desire to secure by Letters Patent of the United States is—

1. In a metal forming machine including a tool and a support therefor movable by the machine to cause the tool to traverse a piece of work in successive parallel paths in a single plane, means by which the tool is caused to form the surface of the work corresponding to the form of the surface of a pattern comprising a tracer movable by the machine in adjustably fixed relation with the tool to traverse the surface of the pattern in successive parallel paths in the same plane as the tool is caused to traverse the work, a hydraulically controlled means actuated by the tracer through movement thereof in a direction toward or from the pattern at an angle to the said single plane of movement to cause movement of the tool in a direction toward or from the work at the same angle to said single plane of movement and to a like extent whereby the surface of the work is shaped to correspond to the surface of the pattern, and means actuated through movement of the tool toward or from the work to maintain the tool in predetermined relationship with the tracer in its movement toward or from the pattern.

2. In a metal forming machine including a tool and a support therefor movable by the machine to cause the tool to traverse a piece of work in successive parallel paths in a single plane, means by which the tool is caused to form the surface of the work corresponding to the form of the surface of the pattern comprising a tool actuating element, a fluid pressure actuated control means therefor, a tracer arranged to traverse the surface of the pattern in successive parallel paths and in the same plane as the tool is caused to traverse the work, means for adjusting the distance apart of the tool and the tracer, means whereby movement of the tracer in a direction toward or from the pattern at an angle to the surface of the pattern traversed actuates said fluid pressure control means to cause movement of the tool toward or from the work at an angle to the surface of the work traversed thereby to a like extent whereby the surface of the work is shaped to correspond to the surface of the pattern and means actuated through movement of the tool toward or from the work to maintain the tool in predetermined relationship with the tracer in its movement toward or from the pattern.

3. In a metal forming machine, a tool, a tracer, a support for a piece of work and a pattern, said machine including a means for causing a relative traverse of the tool and work and of the tracer and the pattern simultaneously in successive parallel straight lines whereby through successive operations of the machine the surface of the work and of the pattern has been traversed throughout the surface respectively presented to the tool and tracer, the said tool and tracer being supported for movement at an angle to the surface of the work and of the pattern to be respectively traversed thereby, means for varying the position of the tool relative to the work surface to thereby vary the depth of the cut to be made by the tool in the traverse of the work, a hydraulic mechanism between the tool and tracer actuated through movement of the tracer in a direction at an angle to its successive paths of traverse of the pattern to thereby cause movement of the tool to a like extent in its successive paths of traverse of the work and means compensating for inaccuracy in the relative position of the tool in respect to the tracer in their movement by the hydraulic mechanism.

4. In a metal forming machine, a tool, a tracer, means for supporting a piece of work and a pattern in spaced relation therewith, means for adjusting the distance apart of the tool and tracer to thereby position the same in identical relation to the respective work and pattern, means for causing a relative traverse of the tool and work and of the tracer and pattern in a series of parallel straight paths across the respective surfaces of the work and pattern, means for varying the position of the tool relative to the surface of the work whereby in successive traverses of the work the tool is made to operate at successively greater distances below the original surface of the work, the tool and tracer being supported for movement at an angle to the surface of the work and of the pattern, and a hydraulic mechanism actuated by the tracer through movement thereof in a direction toward or from the pattern and at an angle to its movement in the traverse of the pattern to cause movement of the tool toward or from the surface of the work to form the same corresponding to the surface of the pattern and means actuated by movement of the tool to compensate for inaccuracy in the position of the tool relative to the tracer.

5. In a metal forming machine, a tracer, a tool, a support for a pattern and for a piece of work, means for causing a traverse of the pattern and work by the tracer and tool, the tracer and the tool both being movable at an angle to the respective path of traverse of the pattern and work, a hydraulic control system including an element attached to the tool and actuatable by movement of the tracer at an angle to its path of traverse of the pattern to move the tool to like degree at the same angle to its path of traverse of the work, means automatically compensating for loss of fluid through leakage in the hydraulic control system to thereby maintain the tool and tracer in an accurate relationship in the respective angular movements thereof, and means for varying the position of the cutting face of the tool in the direction of its angular movement in respect to the pattern contacting face of the tracer in its angular movement caused by the configuration of the pattern in the path traversed.

6. In a metal forming machine, a tracer, a tool, a support for a pattern and for a piece of work, means for causing a traverse of the pattern and work by the tracer and tool respectively, a hydraulic control device for varying the position of the tool in a direction toward or from the work and at an angle to its path of traverse thereof, a support for the tracer relative to which it may move in a direction toward or from the surface of the pattern in its traverse thereof due to the configuration of the pattern surface, said tracer in its movement toward or from the pattern surface actuating the hydraulic mechanism to move the tool toward or from the work in the same direction and to the same extent as the tracer is moved whereby in the traverse of the pattern and work by the respective tracer and tool, the surface of the work is shaped to correspond to the surface of the pattern, a manual means for applying fluid pressure to lift the tracer from the surface of the pattern, and a manually controlled means for applying fluid pressure to the hydraulic mechanism to vary the position of the tool relative to the work surface without varying the position of the tracer relative to the pattern surface.

7. In a metal forming machine, a tracer and a tool adapted for relative traverse of a pattern and a piece of work, a support for the tracer and a support for the tool, the said supports being movable in fixed relation to cause a relative traverse of the pattern and work by the tracer and tool, the tracer and the tool each being movable relative to the respective supports in a direction toward or from the respective pattern and work surfaces, a cylinder associated with the tracer, a piston therein, means for supply of fluid under predetermined pressure to the cylinder, a valve connected with the tracer and movable thereby through movement of the tracer in a direction toward or from the pattern to apply liquid under pressure to one side or the other of the piston and to discharge fluid from the respective other side of the piston, a shaft like element connected to the tracer piston, a cylinder associated with the tool, a piston therein fixedly connected with the tool, means whereby movement of the tracer shaft element applies fluid under pressure to one side or the other of the piston of the tool cylinder to cause movement of the tool piston to the same extent as the tracer piston, and means automatically actuated through movement of the tracer piston to maintain the tool cylinder on opposite sides of the tool piston filled with liquid whereby the tool is rigidly held from movement in a direction toward or from the work through pressure applied to the tool in the cutting operation.

8. In a metal forming machine including a tracer for traversing a pattern and a tool for traversing a piece of work, means for moving the same in a fixed relation in the traverse of the pattern and work, a support for the tool and a support for the tracer the tool and the tracer being movable in the respective supports in a direction toward or from the surface of the respective work and pattern, and a hydraulically controlled mechanism whereby the tool is made to vary its position relative to the work in its path of traverse of the work corresponding to the varied position of the tracer in its traverse of the pattern, comprising a fluid cylinder, a piston therein, a shaft extending through an end thereof and attached to the said piston, means for attaching the said shaft in fixed relation with the tool, and means for applying hydraulic pressure to one or the other sides of the piston depending upon the direction of movement of the tracer in a direction at an angle to its path of traverse of the pattern to thereby cause like movement of the tool in a direction at an angle to its path of traverse of the work.

9. In a metal forming machine, a tracer and a tool, a support for the tracer and a support for the tool movable in a relatively fixed relation by the machine to cause a traverse of the tracer and tool respectively of the pattern and work, both the tracer and the tool being movable relative to the respective supports in a direction toward or from the respective pattern and work, a hydraulic control system including a cylinder associated with the tool, a piston therein, a shaft extending through an end of the cylinder and secured in a fixed relation with the tool, the parts being so arranged that fluid pressure applied to one side or the other of the said piston by movement of the tracer in one direction or the other toward or from the surface of the pattern causes like movement of the tool piston, a manually controlled means for applying fluid under pressure to one side or the other of the said piston of the tool and to permit flow of fluid from the respective other side of the piston whereby the position of the cutting face of the tool in respect to the plane occupied by the tracer may be varied, and a gauge for determining the extent of the said variation in tool position.

10. In a metal forming machine, a tracer and a tool, a support for the tracer and a support for the tool movable in a relatively fixed relation by the machine to cause a traverse of the tracer and tool respectively of the pattern and work, both the tracer and the tool being movable relative to the respective supports in a direction toward or from the respective pattern and work, a hydraulic control system including a cylinder associated with the tool, a piston therein, a shaft extending through an end of the cylinder and secured in a fixed relation with the tool, the parts being so arranged that fluid pressure applied to one side or the other of the said piston by movement of the tracer in one direction or the other toward or from the surface of the pattern causes like movement of the tool piston, a manually controlled means for applying fluid under pressure to one side or the other of the said piston of the tool and to permit flow of fluid from the respective other side of the piston whereby the position of the cutting face of the tool in respect to the plane occupied by the tracer may be varied, a gauge for determining the extent of the said variation in tool position, and automatic means for actuating the said manually controlled means to also apply pressure to one side or the other of the said tool piston to compensate for leakage.

11. In a metal forming machine, a tracer and a tool, a support for the tracer, a support for the tool, said supports being movable in relatively fixed relation by the machine to cause a traverse of the pattern and work by the respective tracer and tool, both the tracer and tool being movable relative to the respective supports in a direction either toward or from the respective pattern and work, a hydraulic control system including a cylinder associated with the tool, a piston therein, a shaft for the piston extending through an end of the cylinder and secured in fixed relation with the tool, a hydraulic pressure applying means including a pump and source of liquid supply, means in the hydraulic control system whereby the fluid supplied to the hydraulic system is under constant predetermined pressure, means whereby movement of the tracer in a direction toward or from the surface of the pattern applies fluid under the predetermined pressure to one side of the piston or the other and permits flow of fluid from the respective opposite side of the piston to return to the source of supply to thereby cause movement of the said piston and consequently of the tool in the same direction and to the same extent as the tracer is moved toward or from the surface of the pattern.

12. In a metal forming machine, a tracer and a tool, a support for the tracer and a support for the tool, means for supporting the pattern and the work, means for relatively adjusting the position of the tracer and tool to the pattern and work, means for causing a relative traverse of the tracer and tool in a straight line across the pattern, means for causing a successive re-positioning of the tracer and tool and pattern and work whereby the surface of the pattern and of the work is traversed by the respective tracer and tool in successive parallel lines, a hydraulic control system between the tool and tracer whereby movement of the tracer in a direction toward or from the surface of the pattern due to the configuration thereof causes a like movement of the tool in a direction toward or from the work, means for supplying fluid under a predetermined pressure to the hydraulic control system, the said hydraulic system including a cylinder, a piston therein, a shaft for the piston secured in fixed relation with the tool whereby movement of the piston moves the tool, and means associated with the tracer whereby movement thereof in a direction toward or from a neutral plane applies pressure to one side or the other of the said piston to correspondingly move the tool, and spring means between the tracer and its support whereby the tracer is held in contact with the surface of the pattern being traversed and to move the tracer in a direction toward the pattern as permitted by the pattern shape and to be placed under tension through pattern shape causing movement of the tracer in a direction away from the work.

13. In a metal forming machine, a tracer, a tool, a support for a pattern and for the work, said machine including means for causing a straight line traverse of the pattern and work by the respective tracer and tool, hydraulic control mechanism between the tracer and tool whereby movement of the tracer at an angle to its straight line path of traverse of the pattern in a direction toward or from the surface thereof moves the tool to like degree relative to the work, a supporting means for the tracer including a cylinder and a piston therein, a shaft element to the end of which the tracer is mounted, said piston having ports and being of hollow cylindrical form, a valve element of cylindrical form and reciprocable to limited degree in the piston to open or close the ports thereof, the said tracer shaft being attached to the valves, a source of supply of fluid under pressure distributed by the variation in position of the valve in the piston to apply fluid pressure to one side or the other of the piston to move the same longitudinally of the cylinder and to discharge the fluid from the respective other side of the piston, a tubular member in which the tracer shaft adjacent the tracer is movable longitudinally, a spring between the tracer and the tube tending to project the tracer to thereby hold the same in contact with the pattern surface, the tracer in traversing the pattern on being caused to move in a direction either toward or from the work due to portions of the pattern being above or below a neutral plane causing movement of the valve to apply pressure fluid to one side or the other of the piston and in traversing a pattern surface in a neutral plane positioning the valve to close the ports of the piston.

14. In apparatus of the character described, a tracer, a tool, means for supporting a pattern and a piece of work to be respectively traversed by the tracer or tool in a series of parallel straight line paths wherein the tracer due to the configuration of the pattern surface is caused to move during its line traverse in a direction toward or from the pattern to thereby cause like movement of the tool relative to the work, a hydraulically controlled mechanism between the tracer and tool actuated by the tracer in its movement toward or from the pattern to cause a like movement of the tool toward or from the work, said hydraulically controlled mechanism including a piston associated with the tracer and a piston associated with the tool hydraulically connected whereby movement of the tracer piston causes movement of the piston associated with the tool to move the tool, said piston associated with the tracer comprising a ported cylindrical piston and a cylindrical valve limitedly reciprocable within the piston to open or close the ports depending upon its direction of movement, and a spring associated with the tracer tending to move the same toward the pattern surface beyond a neutral plane whereby as the tracer moves in its straight line traverse of the pattern in a neutral plane the piston ports are closed by the tracer valve to hold the piston from movement and thereby hold the tool piston and thereby hold the tool from movement toward or from the work and upon the tracer point being moved by its spring to beyond the neutral plane toward the pattern surface the tool is correspondingly moved toward the work and when the tracer is moved by pattern configuration to the opposite side of the neutral plane and away from the work the tool is moved in like manner until the tracer again assumes a neutral position.

15. In apparatus of the character described, a tracer, a tool, means for supporting a pattern and a piece of work to be respectively traversed by the tracer or tool in a series of parallel straight line paths wherein the tracer due to the configuration of the pattern surface is caused to move during its line traverse in a direction toward or from the pattern to thereby cause like movement of the tool relative to the work, a hydraulically controlled mechanism between the tracer and tool actuated by the tracer in its movement toward or from the pattern to cause a like movement of the tool toward or from the work, said hydraulically controlled mechanism including a piston associated with the tracer and a piston associated with the tool hydraulically connected whereby movement of the tracer piston causes movement of the piston associated with the tool to move the tool, said piston associated with the tracer comprising a ported cylindrical piston and a cylindrical valve limitedly reciprocable within the piston to open or close the ports depending upon its direction of movement, a spring associated with the tracer tending to move the same toward the pattern surface beyond a neutral plane whereby as the tracer moves in its straight line traverse of the pattern in a neutral plane the piston ports are closed by the tracer valve to hold the piston from movement and thereby hold the tool piston and thereby hold the tool from movement toward or from the work and upon the tracer point being moved by its spring to beyond the neutral plane toward the pattern surface the tool is correspondingly moved toward the work and when the tracer is moved by pattern configuration to the opposite side of the neutral plane and away from the work the tool is moved in like manner until the tracer again assumes a neutral position, and a hydraulic means actuated by lateral movement of the tracer to cause movement of the tracer piston and the tracer in a direction away from the pattern to thereby move the tool piston and consequently the tool in a direction away from the work.

16. In apparatus of the character described, a tracer for traversing a pattern surface during which the tracer is caused to move toward or from the surface thereof to one side or the other of a neutral plane, a hydraulic mechanism controlled thereby including a cylinder and a piston movable longitudinally thereof, the axis of which coincides with the axis of movement of the tracer toward or from the work, a rod fixedly connecting the tracer and piston means operable by the tracer on movement therefrom to one side or the other of the neutral plane to apply hydraulic pressure to move the piston in the same direction and when the tracer is in the neutral plane to hold the piston from movement, and a hydraulic control means associated therewith whereby pressure tending to move the tracer to one side of its axial line of movement also applies pressure to the piston thereby moving the tracer in a direction away from the work.

17. A hydraulically controlled apparatus for moving a tool toward or from a piece of work during its traverse of the surface thereof by a tracer movable toward or from a pattern surface due to the shape thereof in its path of traverse, comprising a tracer cylinder, a piston movable therein, a valve movable in said piston, said valve being connected with the tracer and having a limited movement longitudinally of the piston, whereby movement of the tracer in one direction or the other moves the valve, the cylinder having ports and the valve through its movement opening or closing the ports of the piston in a manner to apply hydraulic pressure to one side or the other of the piston to move the piston in the same direction until the valve assumes a position closing the ports, means actuated by the piston movement to position the tool relative to the work surface, and means whereby lateral pressure in any direction on the tracer tending to move the same from its position in axial alignment with the cylinder by a projecting surface on the pattern moves the valve to apply pressure to the piston in a direction tending to move the tracer away from the pattern and thereby move the tool in a direction away from the work.

18. In hydraulically controlled mechanism, a tracer and tool adapted to be moved in a fixed relationship with the respective pattern and work, a cylinder associated with the tracer, a cylinder associated with the tool, a piston therein fixed to the tool, a piston in the tracer cylinder, a tubular element movable with the tracer piston, a rod fixed to the tracer piston at one end and to the other end of which the tracer is attached reciprocable in the tubular element, the tracer piston being ported, a valve within the tracer piston fixed to the tracer rod and through movement of which one or the other of the ports of the tracer piston are opened, means for applying hydraulic pressure to the interior of the piston and to be distributed by the valve to one side or the other of the tracer piston to cause movement thereof in its cylinder, means whereby movement of the tracer piston applies fluid under pressure to one side or the other of the tool piston, said tubular element in which the tracer rod is reciprocable being pivotally mounted to permit the tracer to be moved in any direction laterally of the shaft axis, means tending to yieldably restrain such movement of the tracer and permitting the tracer to be moved by pressure in excess thereof, and means whereby such lateral movement of the tracer actuates the valve to apply pressure to one side of the tracer piston and thereby move the tracer tube and connected parts in the same direction as is caused by movement of the tracer on the axis of the shaft away from the work.

19. In hydraulically controlled mechanism, a tracer and tool adapted to be moved in a fixed relationship with the respective pattern and work, a cylinder associated with the tracer, a cylinder associated with the tool, a piston therein fixed to the tool, a piston in the tracer cylinder, a tubular element movable with the tracer piston, a rod to which the tracer is attached reciprocable in the tubular element, the tracer piston being ported, a valve within the tracer piston fixed to the tracer rod and through movement of which one or the other of the ports of the tracer piston are opened, means for applying hydraulic pressure to the interior of the piston and to be distributed by the valve to one side or the other of the tracer piston to cause movement thereof in its cylinder, means whereby movement of the tracer piston applies fluid under pressure to one side or the other of the tool piston, said tubular element in which the tracer rod is reciprocable being pivotally mounted to permit the tracer to be moved in any direction laterally of the shaft axis, means tending to yieldably restrain such movement of the tracer and permitting the tracer to be moved by pressure in excess thereof, and means whereby such lateral movement of the tracer actuates the valve to apply pressure to one side of the tracer piston and thereby move the tracer tube and connected parts in the same direction as is caused by movement of the tracer on the axis of the shaft away from the work, said last named means comprising a cylinder directly connected with the tracer piston and through which the tracer rod extends to the tracer piston, a piston within the said last named cylinder loosely mounted on the rod, said rod at one end having a part engaged by the piston when under hydraulic pressure at the opposite end to move the tracer rod and thereby move the tracer piston to open the ports thereof to apply fluid pressure to one side of the tracer piston and thus move the tracer piston in the same direction as the said piston slidable on the tracer rod is moved, a laterally movable disc valve actuatable by movement of the tracer tube on its pivotal axis to apply hydraulic pressure to the said piston slidable on the tracer rod and move the same to engagement with the said portion on the rod to cause movement of the rod and consequently of the tracer in a direction along the rod axis until the tracer assumes its neutral axial position and the valve disc is returned to neutral position, said cylinder for the slidable piston having a minute leakage aperture from high pressure to the chamber forward of the piston and further having a small aperture from the chamber at the rear of the piston to the low pressure whereby when the disc valve assumes neutral position the slidable piston by pressure in the chamber forward of the piston is moved out of contact with the portion of the tracer rod engageable thereby and out of position to effect axial movement of the tracer rod by pressure applied thereto to move the tracer in a direction toward or from the pattern.

20. In hydraulically controlled mechanism for moving a tool toward or from a work surface to be formed to correspond to the surface of a pattern by movement of the tracer toward or from the pattern surface during traverse of the pattern and work by the tool and tracer in a series of parallel straight lines, a cylinder, a piston movable axially thereof, a tracer fixed to and movable by the piston, a valve in the piston, said piston having ports controlled by the valve, a rod attached to the valve and to a projecting end of which the tracer is attached, spring means for maintaining substantially constant light pressure contact of the tracer on the pattern whereby, due to configuration of the pattern, the tracer may be initially moved in a direction either toward or away from the pattern and thereby move the valve to apply fluid pressure to one side or the other of the piston to effect movement thereof in the same direction as the tracer is initially moved, a piston and cylinder for the tool in which the piston is fixedly connected with the tool, means whereby movement of the tracer piston causes a corresponding movement of the piston for the tool, means whereby lateral pressure applied to the tracer through contact with a surface configuration of the pattern and a consequent displacement of the tracer from its axial position moves the tracer piston to thereby move the tracer in a direction away from the pattern and thereby move the tool in the same direction to the same extent away from the work.

21. In a metal forming machine, a tracer, a tool, a support for a pattern and for a piece of work, means for causing a traverse of the pattern and work by the tracer and tool, the tracer and the tool both being movable at an angle to the respective path of traverse of the pattern and work, a hydraulic control system including an element attached to the tool and actuatable by movement of the tracer at an angle to its path of traverse of the pattern to move the tool to like degree at the same angle to its path of traverse of the work, and means automatically compensating for loss of fluid through leakage in the hydraulic control system and including a tool controlled valve means in said hydraulic control system to thereby maintain the tool and tracer in an accurate relationship in the respective angular movements thereof.

22. In a metal forming machine, a tracer, a tool for respectively traversing a pattern and a piece of work, means for causing a traverse of the pattern and work by the tracer and tool in a predetermined path, a hydraulic control system between the tracer and the tool operable by movement of the tracer by departure from its predetermined path of traverse of the pattern to cause a like movement of the tool in respect to its predetermined path of traverse of the work, and means compensating for loss of fluid in the hydraulic system and including a tool controlled valve means in said hydraulic control system whereby the tool is maintained in accurate relation to the tracer in any possible movement of the tracer from its predetermined path of traverse of the pattern.

23. In a metal forming machine, a tracer and a tool for respectively traversing a pattern and a piece of work, means for causing a straight line traverse of the pattern and the work respectively by the tracer and tool, a hydraulic control system between the tracer and the tool and under control of the tracer, the tool being held by hydraulic pressure to prevent movement of the tool in a direction at an angle to its straight line path of traverse of the work by pressure between the tool and work, and means compensating for loss of fluid in the hydraulic control system by leakage or displacement of the fluid including a tool controlled valve means in said hydraulic control system whereby the tool instantly responds to any possible movement of the tracer relative to its straight line path of traverse of the pattern and is maintained accurately in relation to the work as determined by the position of the tracer relative to its straight line of traverse of the pattern.

24. In a metal forming machine, a tracer and a tool for respectively traversing a pattern and a piece of work to form the work surface corresponding to the pattern surface, means for causing a straight line traverse of the pattern and the work respectively by the tracer and tool, a closed hydraulic circuit between the tracer and the tool under control of the tracer whereby movement of the tracer in a direction at an angle to its path of traverse of the pattern causes like movement of the tool in respect to its path of traverse of the work, said closed hydraulic system rigidly holding the tool in the position determined by the tracer and preventing movement of the tool in a direction at an angle to its path of traverse due to pressure between the tool and the work, and means controlled by the tool through movement at an angle to its path of traverse of the work compensating for loss of fluid in the closed hydraulic circuit by leakage or displacement whereby the tool is constantly maintained in position relative to the work in correspondence with the position of the tracer in respect to the pattern.

25. In a metal forming machine including a tool and a support therefor movable by the machine to cause the tool to traverse a piece of work in successive parallel paths in a single plane, means by which the tool is caused to form the surface of the work corresponding to the form of the surface of a pattern, a tracer movable by the machine in mechanically fixed relation with the tool to traverse the surface of the pattern in successive parallel paths in the same plane as the tool is caused to traverse the work, a hydraulically controlled means actuated by the tracer through movement thereof at an angle to the said single plane of movement to cause movement of the tool at the same angle to said single plane of movement and to a like extent whereby the surface of the work is shaped to correspond to the surface of the pattern, and means compensating for leakage or loss of fluid in the hydraulic controlled means to thereby constantly maintain the tool in a position relative to the surface of the work traversed in exact correspondence with the position of the tracer in relation to the surface of the pattern traversed.

CLIFFORD H. KAIN.